(12) United States Patent
Julian

(10) Patent No.: US 9,925,932 B2
(45) Date of Patent: Mar. 27, 2018

(54) PORTABLE PRIVATE PANEL TOILET SYSTEM AND METHOD

(71) Applicant: Vincent Julian, Salt Lake City, UT (US)

(72) Inventor: Vincent Julian, Salt Lake City, UT (US)

(*) Notice: Subject to any disclaimer, the term of this patent is extended or adjusted under 35 U.S.C. 154(b) by 36 days.

(21) Appl. No.: 15/187,186

(22) Filed: Jun. 20, 2016

(65) Prior Publication Data

US 2017/0361786 A1  Dec. 21, 2017

(51) Int. Cl.
| | |
|---|---|
| *E03D 5/04* | (2006.01) |
| *B60R 15/04* | (2006.01) |
| *E03D 11/00* | (2006.01) |
| *E04H 1/12* | (2006.01) |

(52) U.S. Cl.
CPC ............ *B60R 15/04* (2013.01); *E03D 11/00* (2013.01); *E04H 1/1216* (2013.01)

(58) Field of Classification Search
CPC   B60R 15/04; E03D 11/00; E03D 7/00; E03D 11/12; E03D 11/11; E03D 5/014; E04H 1/1216; B61D 35/007
USPC ...................................................... 4/312, 460
See application file for complete search history.

(56) References Cited

U.S. PATENT DOCUMENTS

| | | | | |
|---|---|---|---|---|
| 3,423,766 A * | 1/1969 | Eger | ...................... | E03D 11/11 4/317 |
| 4,380,836 A * | 4/1983 | Braxton | ................ | E04H 1/1216 4/449 |
| 5,379,466 A * | 1/1995 | Davies | .................... | A47K 3/325 4/449 |
| 5,673,962 A * | 10/1997 | Maieli | ..................... | B60R 15/04 296/164 |
| 5,778,462 A * | 7/1998 | Bjorklund | ............. | E04H 1/1216 4/460 |
| 6,079,770 A * | 6/2000 | Bocian | .................... | B60R 15/04 296/190.01 |
| 6,393,627 B1 * | 5/2002 | Avila | ..................... | A47K 11/02 4/449 |
| 9,605,424 B2 * | 3/2017 | Bikker | ............... | E04B 1/34336 |
| 2003/0121093 A1 * | 7/2003 | Braxton | ................ | E04H 1/1216 4/476 |
| 2003/0167562 A1 * | 9/2003 | Weiss | ..................... | A47K 11/02 4/476 |
| 2006/0185075 A1 * | 8/2006 | Yang | ..................... | E04H 1/1216 4/664 |
| 2009/0235445 A1 * | 9/2009 | Goldstein | ............. | A47K 11/02 4/462 |
| 2011/0247132 A1 * | 10/2011 | Watts | ..................... | B60R 15/04 4/458 |

(Continued)

*Primary Examiner* — Benjamin R Shaw
(74) *Attorney, Agent, or Firm* — M. Reid Russell

(57) ABSTRACT

The invention it in a private portable toilet system for mounting on a vehicle for transport to the scene of an emergency where it is hydraulically lowered to the ground, and its component panels are out folded to an erected attitude, forming a cubical for containing a toilet platform that is hydraulically moved outwardly from its stowed attitude into which cubical, readying the toilet system for use, where, after use, the toilet platform is moved back to its stowed attitude, and the erection steps are reversed to collapse the toilet system by infolding the component panels to a flat vertical attitude and lifting the toilet system back to it's stowed position to the vehicle for travel.

5 Claims, 13 Drawing Sheets

(56) References Cited

U.S. PATENT DOCUMENTS

| | | | |
|---|---|---|---|
| 2011/0290291 A1* | 12/2011 | Neal | E04H 1/1244 135/96 |
| 2012/0167297 A1* | 7/2012 | Poust | B60R 15/04 4/321 |
| 2014/0143945 A1* | 5/2014 | Chen | E03D 7/00 4/321 |
| 2014/0345039 A1* | 11/2014 | Weir | E04H 1/1216 4/476 |
| 2015/0272407 A1* | 10/2015 | Weir | E04H 1/1216 4/476 |
| 2017/0226722 A1* | 8/2017 | Marcel | E03D 7/00 |

* cited by examiner

PORTABLE PRIVATE PANEL TOILET SYSTEM AND METHOD

BACKGROUND OF THE INVENTION

Field of the Invention

The invention relates to private portable toilet systems for mounting on a truck type vehicle for operations in a remote area or emergency scene where toilet facilities are not available.

Prior Art

Heretofore, little or no preparations are provided for persons, particularly victims at a scene of an emergency or responders, for handling their bodily function needs. For example, persons displaced by a fire, until temporarily provided for, often don't have access to toilet facilities, further magnifying their discomfort. The invention, is intended to provide comfort to fire victims and affected persons in a wildness area, or persons at the scene of an automobile accident, by providing portable toilet facilities mounted onto an emergency responder vehicle, such as a fire truck, or a vehicle, such as a tilt bed truck for removal of a damaged automobile from an accident scene, or for operations in a wilderness area, or the like.

In practice, the invention is a portable private toilet system that is ready to be assembled at a site of an emergency from a sequential out folding of side, front and roof panels of a toilet system that is mounted to an emergency responder vehicle. The toilet system is arranged to be hydraulically lowered to the ground at the scene of the emergency and is, after use, the side front and roof panels folded back to a flat attitude and is hydraulically lifted off from the ground, back to a stowed attitude to the side of the emergency responder vehicle for transport. During use, the toilet can be flushed into a holding tank with the water therein circulated from a water source on the emergency responder vehicle, promoting multiple uses. Which holding tank can be conveniently dumped by operation of a dump valve while the toilet system is in its stowed attitude.

Where portable toilets off loaded from a truck, or the like, are convenient for meeting temporary toilet needs, as on a job site, such generally do not accompany emergency vehicles, or the like, to provide for needs of persons at an emergency sites, such as at a fire, vehicle accident site, or similar unforseen situations that only a system like that of the invention is suitable for conveniently meeting the needs of persons at such site.

SUMMARY OF THE INVENTION

It is a principal object of the present invention to provide a portable private toilet system that is arranged for mounting to an emergency vehicle as used, for example, by first responders at fires, accidents, emergencies in rural areas, and the like, where the portable private toilet system is mounted onto the emergency vehicle where a toilet cubical is conveniently lowered to the ground with toilet facilities pulled away from the vehicle, within the cubical, for use by to victims and responders, and is conveniently pushed back and raised back to its stowed attitude for travel.

Another object of the present invention is to provide a private portable toilet system that can be quickly and easily set up at a scene of a fire, vehicle accident, or the like, where toilets are not readily available, that can provide for the personal needs or victims and first responders with the toilet system arranged to be hydraulically lowered to the ground and a toilet housing pulled out from its stored attitude to the side or rear of the emergency vehicle, where the toilet system includes hinge connected side panels and a top skylight panel is rotated into place forming a cubical, and includes a hinged access door to allow for passage of a person into the toilet cubical, and which access door can then be closed, providing privacy to the user.

Still another object of the present invention is to reposition the toilet system back into its stowed attitude on the emergency vehicle by retracting the toilet housing back to its stowed attitude and folding the access door sides panels roof skylight panel into a flat stack against a toilet system back or rear panel whereat a mechanical or hydraulic arrangement is operated to lift the assembly into alignment to its seat on the side or end of the emergency vehicle, where it can be locked in place for travel.

Still another object of the present invention is to provide an emergency toilet that flushes like a conventional home toilet with water provided from s supply carried on the emergency vehicle or from a separate water storage vessel of the toilet system, and which toilet system is arranged to flush into a waste holding tank through a valve for later dumping the toilet wastewater into a sewer line, or the like.

The invention is in a portable private toilet system for transport by an emergency responder vehicle to be conveniently moved to a site of an emergency where it is lowered to the ground and set up for use, and can be quickly lifted back to its stowed attitude for transport after use. The portable private toilet system consists of a rear or back panel that is mounted in a frame and is connect along both left and right edges, as taken from the perspective of facing outwardly from the frame, and includes hinged left and right panels, with a top or skylight panel connected at its rear end to a top edge of the rear or back panel, and with an access door hinge connected along its right edge to a forward end of the right panel, forming a cubical that contains a toilet platform. Which toilet platform is separately maintained to the vehicle apart from the rear or back panel to be movable along the ground to pass under the lower edge of the rear or back panel when moved horizontally along the ground into the cubical. The toilet platform has a toilet seat arranged thereon over a toilet opening and receives a plug installed therein during travel that is removed prior to toilet use. Which vertical movement of the panels prior to their out folding and the horizontal movement of the toilet platform is provided by a hydraulic system that is lever valve actuated at a control panel mounted to the responder vehicle.

Further, the invention includes a fresh water supply, a waste holding tank contained in the toilet platform that mounts a toilet bowl and is arranged to receive toilet waste water from the toilet bowl when the toilet is flushed and acts as a holding tank for contained the toilet waste water until the system is dumped. A fresh water source for flushing the toilet is provided for gravity feeding through a flex hose, and the toilet bowl flushes through a flex hose into the holding tank that can be drained through a dump valve to drain after use.

Additionally, the invention sets out the steps involved for sequentially out folding the panels of the invention into a the cubical of the portable private panel toilet system, and for moving the toilet platform from its stowed attitude into the cubical, sets out the steps for retracting the toilet platform back to its stowed position after use, and sets out the steps for infolding the panels to collapse them together for lifting them back to their stowed attitude to the transport vehicle.

BRIEF DESCRIPTION OF THE DRAWINGS

These and other objects and features of the present invention will become more apparent from the following description in which the invention is described in detail in conjunction with the accompanying drawings:

FIG. 11 shows a front elevation view of the panel of FIG. 2A that shows hydraulic controls of the control panel or FIG. 2a, shows an upper section thereof that includes electric switches for energizing the system electrical controls and shows a dump valve of the waste water disposal system housing.

DETAILED DESCRIPTION

The invention, as is hereinafter described, is in a vehicle mounted private portable toilet system, that, hereinafter is referred to as a toilet system and is for mounting on an emergency vehicle, or the like, that, during vehicle travel, is locked to the vehicle body, and at an emergency scene, the toilet system components are erected on site by out folding the individual side panels, access door panel and skylight roof panel, around their hinge connections to one another and to the rear or back panel that is arranged in a frame of the toilet system that is to travel vertically along vertical side rails that are secured to the sides of a wall that connects to the vehicle bed. Taken from the perspective of the toilet system, looking out from its mounting to the side of the vehicle, the components of the toilet system are sequentially pivoted away from the vehicle into position, forming a cubical of the toilet system. Where at, to remount the toilet system to a stowed attitude to the vehicle, the toilet system components are in folded back together, forming a stack against the frame and rear or back panel, in the reverse order to their erection, collapsing the structure for storage to the vehicle, and the toilet system is locked to the vehicle for travel. Also, the invention includes the steps as are practice for assembling and disassembling the toilet system, and for preparing the assembly for a next use.

Figure 1:
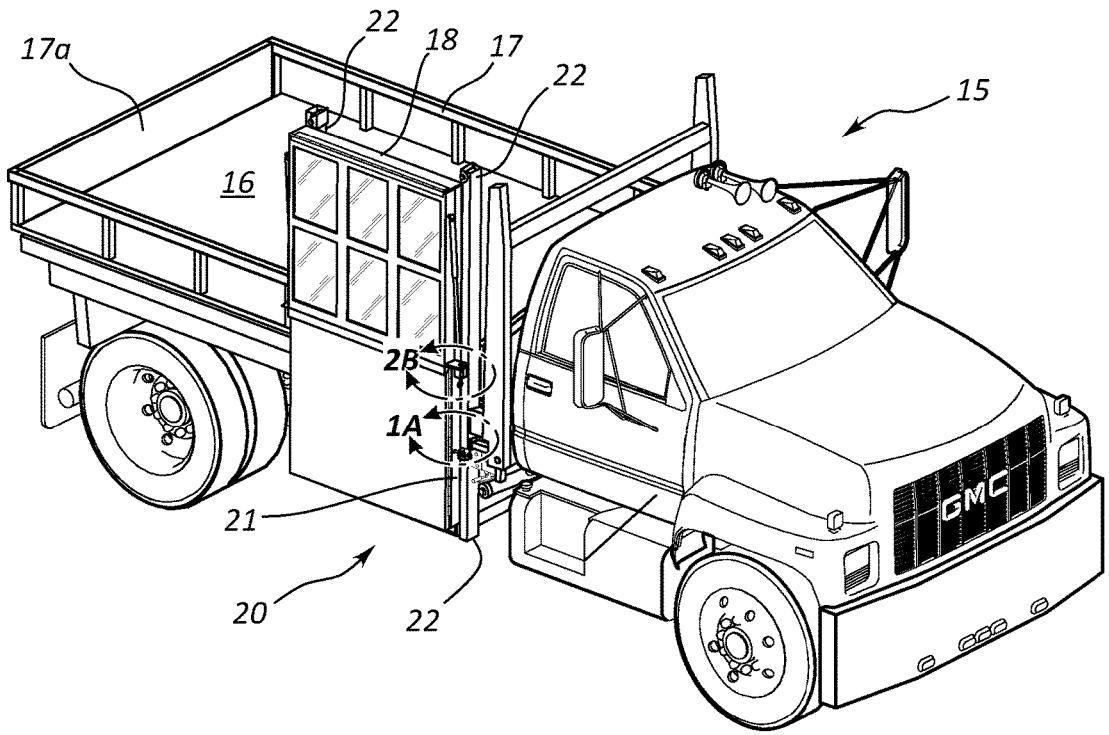
FIG. 1 is a profile perspective view taken from a passenger side of a flat bed truck that is an example of a vehicle that is suitable mounting the portable panel private system of the invention as a vehicle that is suitable for accompanying an emergency vehicle, such as a fire truck, ambulance or the like, to a fire, a vehicle accident, or the like, with the vehicle, shown having a bed that can tilt, can include a ramp, or the like, for moving a damaged vehicle, as with a winch, onto the truck bed, and shows the invention in a portable private panel toilet system that is shown folded on itself and is seated against fixed wall on a passenger side of the truck bed for transport.
Figure 1A:
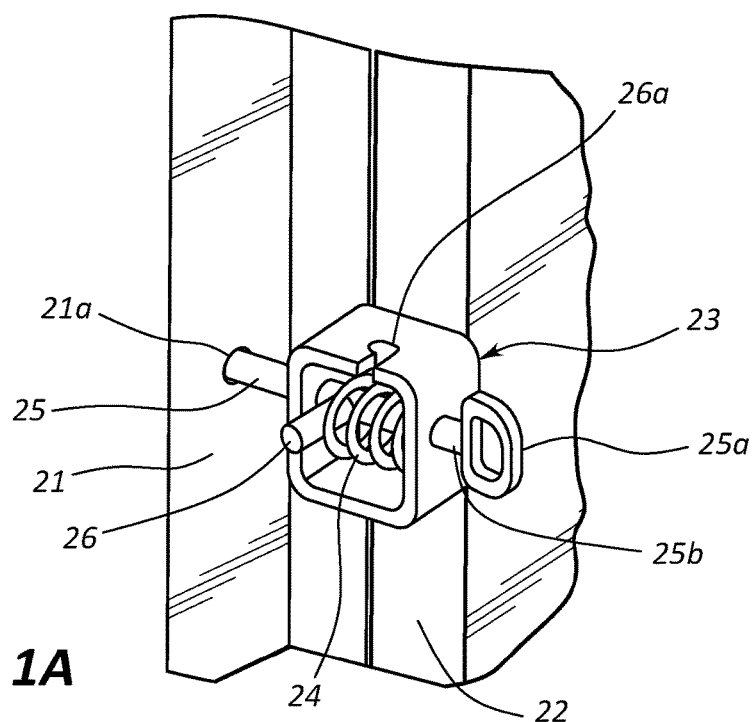
FIG. 1A is a side elevation perspective view taken within the line 1A-1A of FIG. 1 showing a pin safety lock that is mounted to the side of a toilet system frame that mounts a rear or back panel, with the frame fitted between vertical side rails that are secured to the truck back wall that is secured to the truck bed and the pin safety lock is spring biased such that, when released, urges a pin end thereof into a lock hole that is formed in the frame of the toilet system, locking the toilet system in its stowed attitude, as shown in FIG. 1, with, when a handle of the pin safety lock is pulled against the spring biasing, the pin end is retracted out of the side of the frame, allowing the toilet system to be lowered to the ground, as shown in FIG. 2.
Figure 2:
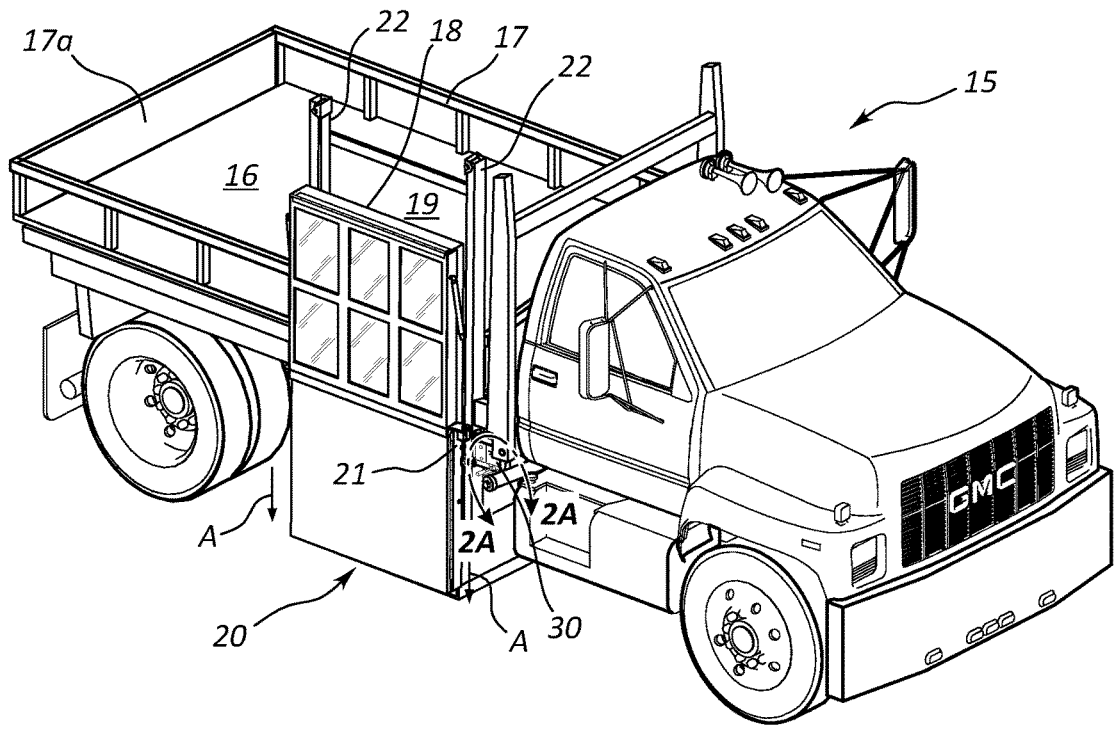
FIG. 2 is a view like that of FIG. 1, only showing, with arrows A, the toilet system frame as having been released and has been lowered, along the side rails attached to the vehicle side, to where the bottom of the toilet system is supported on the ground, below the passenger side of the truck.

FIG. 1 shows a single axle truck 15 that has a flat bed 16 with sides 17, an end gate 17a and includes a portable private toilet system 20 of the invention, hereinafter referred to as toilet system 20. Shown therein the toilet system 20 includes a frame 21 that contains a rear or back panel 18 where the frame 21 and rear or back panel 18 are arranged to travel up and down along side rails 22 that are mounted to opposite vertical sides of a wall 19 that is secured to a passenger side of the truck 15 bed 16. Which side rails 22 are spaced apart to receive the frame 21 that maintains the back or rear panel 18, that travels along the wall 19 that is fixed to the truck bed. Which arrangement of the frame 21 for travel along the side rails 22, includes a safety lock 23, as shown best in FIG. 1A, that is taken within the line 1-1 of FIG. 1, and provides for locking the frame 21 to at least one of the vehicle side rail 22 during vehicle travel. With, in practice, the frame 21 is preferably arranged to be hydraulically lifted and lowered to provide for downward travel of the toilet system 20, after release of a safety lock 23. As shown, in FIG. 1A, the safety lock 23 is a spring biased lock that includes a body 23a that is mounted onto the vehicle side rail 22 such that an end 23b thereof is proximate to the adjacent surface of the frame 21, and which body 23a houses a coil spring 24 that biases a pin 25 towards the adjacent surface of the frame 21. So arranged, a pin 25 top end will extend outwardly from the body 23a to fit with a hole 21a formed in the frame 21, such that, when the toilet system frame 21 is retracted, movement of the pin 25 top end out of the frame hole 21a releases the toilet system 20 to be lowered to the ground, as shown in FIG. 2. Which toilet system 20 travel is preferably by operation of the hydraulic system, after pin 25 retraction. Which pin 25 retraction is provided by manually pulling a handle 25a that is secured across the pin 25 base end 25b the pin 25 top end is pulled out of the hole 21a formed in the frame 21, thereby releasing the frame 21 from the side rail 22 to allow it to be lowered to the ground, as shown in FIG. 2. Which pin 25 retraction can be maintained, against the biasing of the coil spring 24, by a turning of the handle 25a such that a handle peg 26, that extends outward from the pin 25 body, below the pin top end, aligns with a horizontal notch 26a formed in the body 23, after which turning and release of the handle 25a, the frame 21 will remain disconnected from the side rail 22. Whereafter, it should be understood, a lowering of the toilet system 20 preferably utilizes a hydraulic system, though it may be by operation of a manual system, within the scope of this disclosure.

Figure 2A:
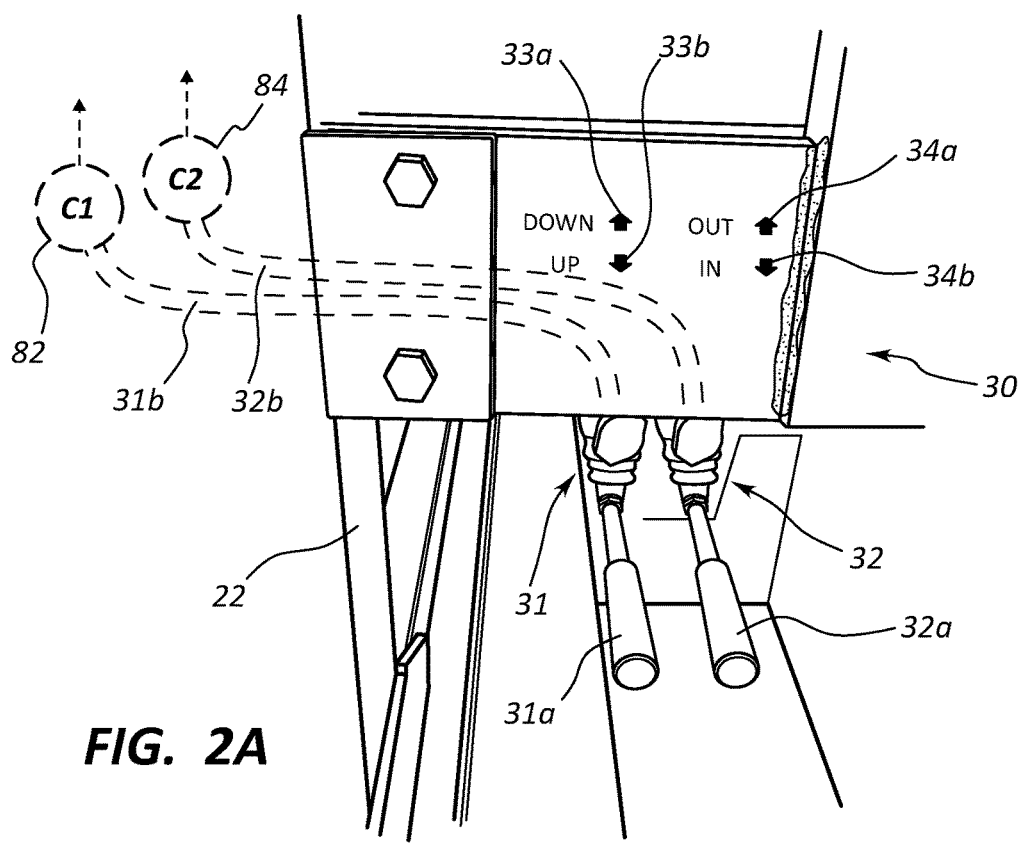
FIG. 2A shows an enlarged view of a lower portion of a control panel located within the lines 2A-2A of FIG. 2, that includes first and second lever arms whose, with vertical movement of the first lever arm to operate a hydraulic system for lowering and lifting the private toilet system from its retracted to its lowered extended attitude, the private toilet system traveling along the sides of the rails secured to the passenger side of the truck bed, and with vertical movement of the second lever arm for moving the private toilet system outwardly and returning it to its stowed attitude.

FIG. 2 shows the toilet system 20 as having been lowered to the ground, as indicated by arrow A, and shows a control panel 30 for controlling operation of the system hydraulic system that is mounted to the side rail 22. In FIG. 2A, is shown an enlarged view of which control panel 30, that is shown as including a pair of lever arms with handle ends 31a and 32a projecting outwardly from valves 31 and 32. The lever arm handles 31a and 32a are manually moved vertically between high and low positions, operating valves 31 and 32, respectively, to move the toilet system 20 vertically, with arrows 33a and 33b associated with lever arm handle 31a, indicating down and up, respectively, and with arrows 34a and 34b shown associated with lever arm handle 32a indicating out and in, respectively, of the toilet system 20. Also, valves 31 and 32 operated by the lever arms handles are shown connected to hydraulic lines 31b and 32b, shown in broken lines, connecting to vessels C1 and C2, respectively, that are sources of hydraulic fluid under pressure and are each identified as a vessel 82 and 84, respectively, that, preferably are charged from the vehicle 15 hydraulic system, through, the toilet system of the invention could, within the scope of this disclosure, employ a hydraulic pump or pumps to provide which hydraulic fluid under pressure. In practice, the lifting of lever arm handle 31 provides for a lowering of the toilet system 20 to the attitude shown in FIG. 2, and, when the lever arm handle 31 is pressed to a down position, the toilet system will be lifted back to its stowed attitude, as shown in FIG. 1, where the safety lock 23 can be engaged. The lifting and lowering of the lever arm handle 32a, to the out and in 34a and 34b positions, respectively, causes a toilet platform 70, shown in FIGS. 7 through 10, to move out of its stowed attitude beneath the vehicle flat bed 16 into the toilet system 20 cubical and back therefrom to its stowed attitude to the vehicle for travel. Which formation of the toilet system cubical and in and out and up and down travel of the toilet system 20 and toilet system platform 70 is discussed hereinbelow.

Figure 2B:
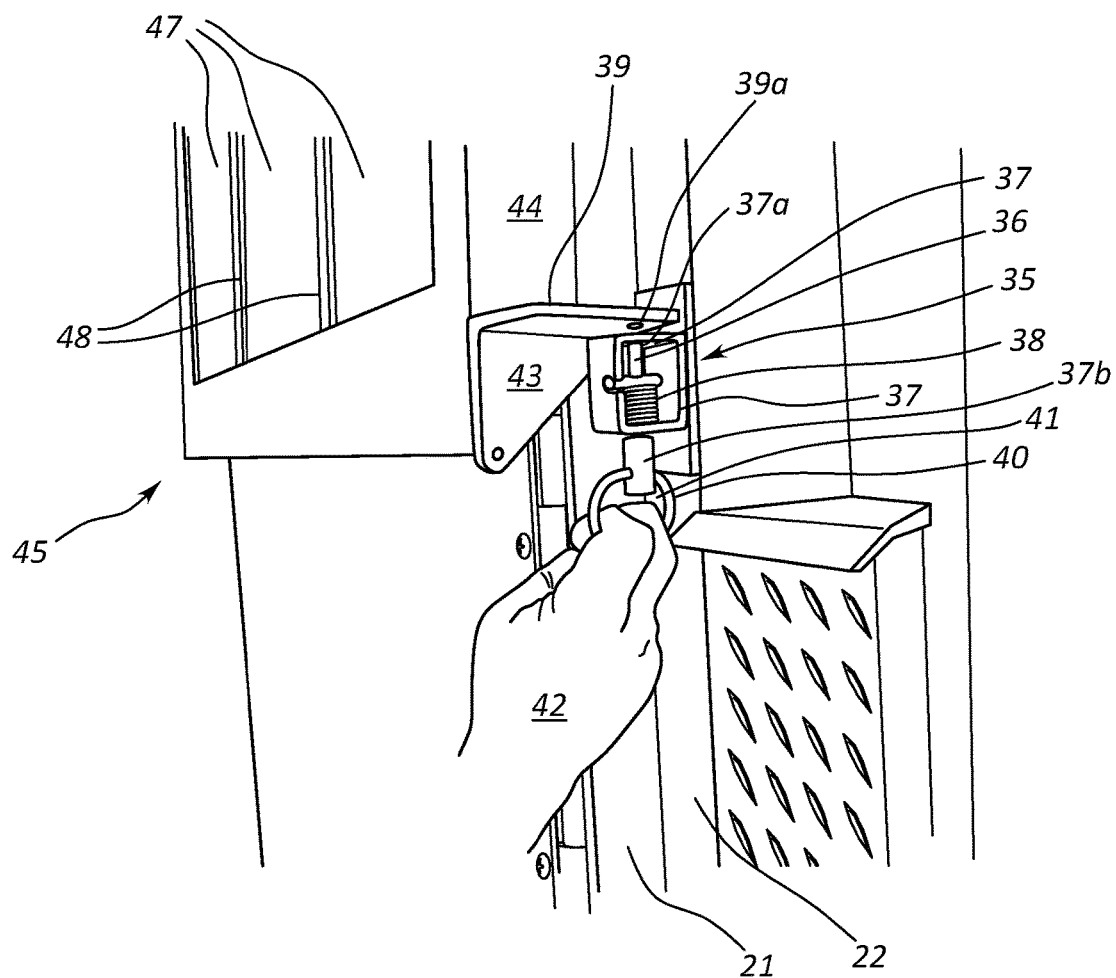
FIG. 2B is an enlarged perspective view taken along the line 1-1 of FIG. 1 showing a pin safety lock that is spring biased such that, when released, urges a pin end into a lock hole formed in a flange that extends outwardly from a right side of a sky roof panel of the toilet system with, when a handle end thereof is pulled against the spring biasing, pulls the pin end out from the flange hole, to allow the sky roof panel to be pivoted to the attitude shown in FIG. 3.

FIG. 2B shows an enlarged perspective view taken along the line 2B-2B of FIG. 1 and shows a pin safety lock 35 that is for maintaining a skylight roof panel 45 to the left side rail 21 during travel and is released prior to lowering the toilet system 20 to the ground. As shown, the safety lock 35 includes a pin 36 that is arranged to slide within a housing 37 and is biased by a coil spring 38 to extend a pin end out of an opening in the housing 37 top end 37a that travels into a lock hole 39a that is formed through a right angle bracket flat side 39 that extends outwardly from the other right angle bracket flat side 43 that is shown mounted onto a lower end of a right side 44 of a skylight roof panel 45. A hand 42, of a person 41, is shown pulling a ring 40 that is fitted through a bottom end 37b of the pin 36, operating against the biasing of the coil spring 38. So arranged, before the coil spring 38 is pulled to the attitude shown in FIG. 2B, the pin end 36a will extend out of the lock hole 39a formed through the bracket flat side, and, when the pin end 36a is pulled out of the lock hole 39a, the skylight roof panel 45 is allowed to be pivoted to the attitude shown in FIG. 3. Which pin safety lock 35 holds the skylight roof panel 45 top the frame 22 and against a left side panel 55 of the toilet system 20 during travel, preventing a flapping movement of the skylight roof panel 45 around a hinge 46 that connects it to a the top edge of frame 21 that holds the rear or back panel 18.

Figure 3:
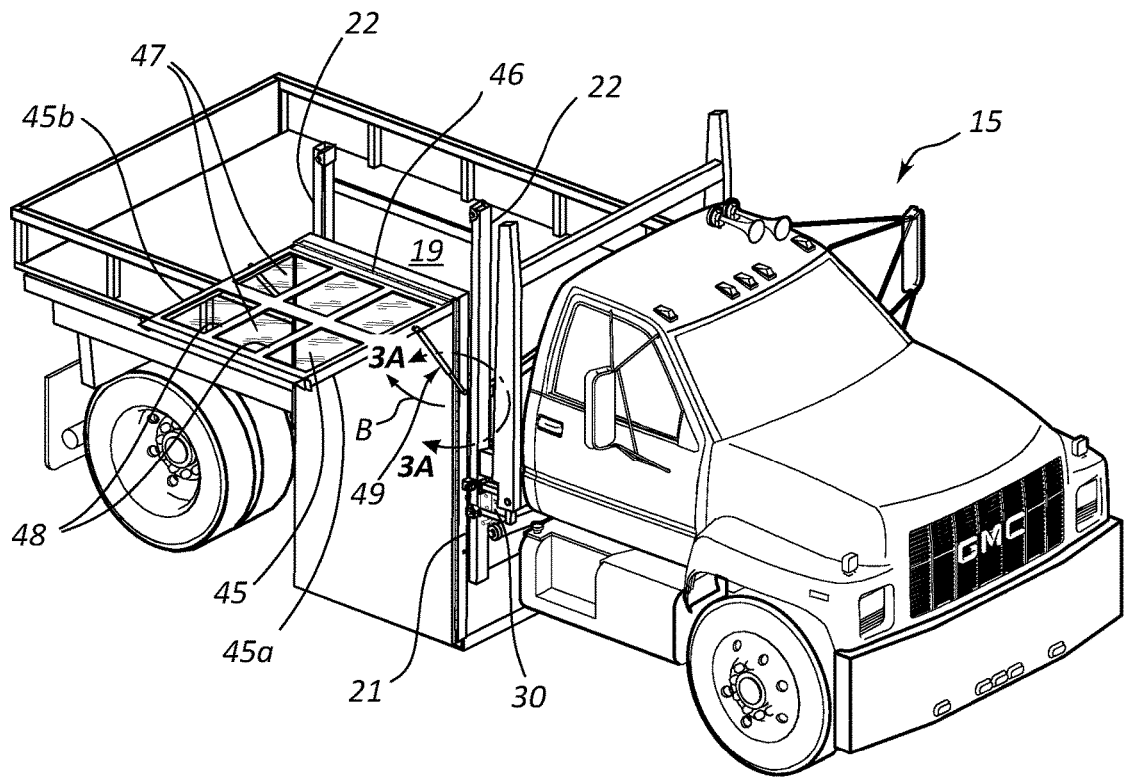
FIG. 3 is a view like that of FIGS. 1 and 2, only showing, a skylight roof panel as having been rotated outwardly, pivoting, as shown in arrow B, a brace that extends from the a mid-point of the skylight roof panel to a pivot on the frame right side of the door edge.
Figure 3A:
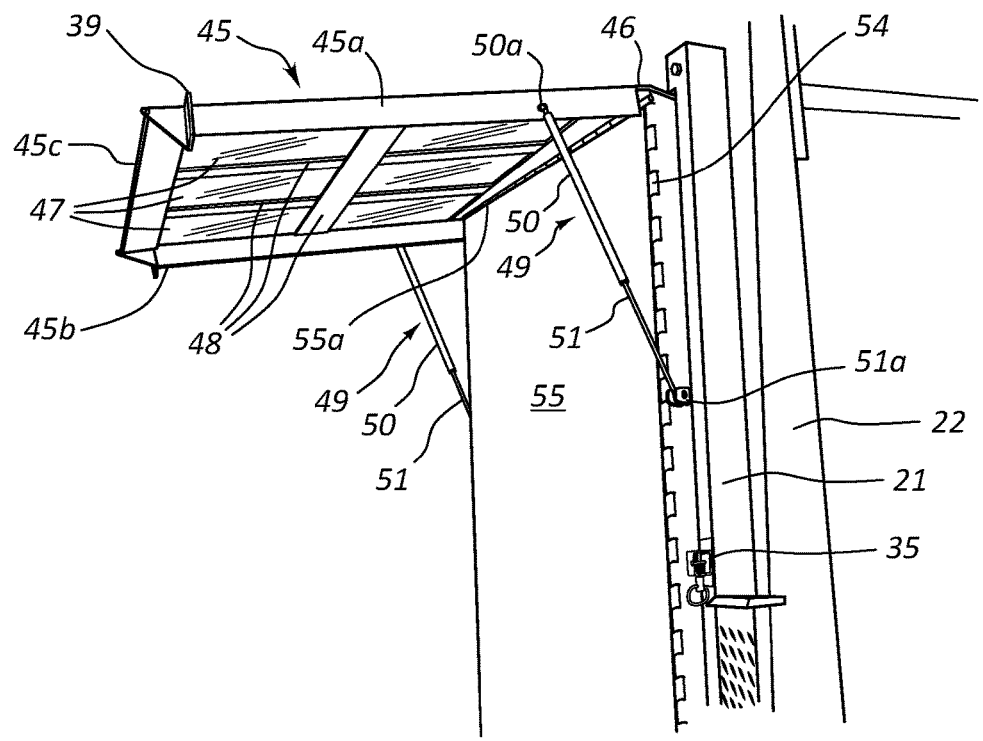
FIG. 3A show a sectional view taken within the line 3A-3A of FIG. 3 showing the skylight roof panel as having been moved to its extended attitude.

FIG. 3 is a figure like that of FIG. 2 except that it shows the skylight roof panel 45 as having been rotated, as illustrated by arrow B, around its hinge connect 46 to the top edge of the frame 21 that mounts the rear or back wall 18. FIG. 3A, shows the skylight roof panel 45 as including an arrangement of window panes 47 that are mounted in a frame 48, and includes a pair of pneumatic pistons 49 that each include a cylinder 50 with a rod 51 fitted to slide therein. As shown, each cylinder end 50a is pivotally mounted to, respectively, each of the sides 45a of the skylight roof panel 45, and each rod 51 end 51a is pivotally mounted, respectively, to each of the frame 21 sides. Which pneumatic pistons 49 provide for maintaining and supporting the skylight roof panel 45 in its outwardly extended attitude from the frame 21 until the respective left and right side panels 55 and 56 top edges 55a and 56a, respectively, as taken from the perspective of a person looking outward from the outer surface to the toilet system 20, and which left and right side panels 55 and 56 top edges 55a and 56a, respectively, are shown positioned below to support the outer edges of the skylight roof panel 45. FIG. 3A also shows the frame 21 top edge as including a hinge 46 that connects to the rear edge of the skylight roof panel 45, and also shows a left side panel 55 of the toilet system 20, as taken from the perspective of a person facing outwardly from the toilet system 20, as having a rear edge that is connected to a left side of the frame 21 by a hinge 54 to provide for an outward pivoting of the left side panel 55 to move the left side panel top edge 55a under the left side 45a of the skylight roof panel, for supporting which left side 45a, as shown in FIG. 4.

Figure 4:
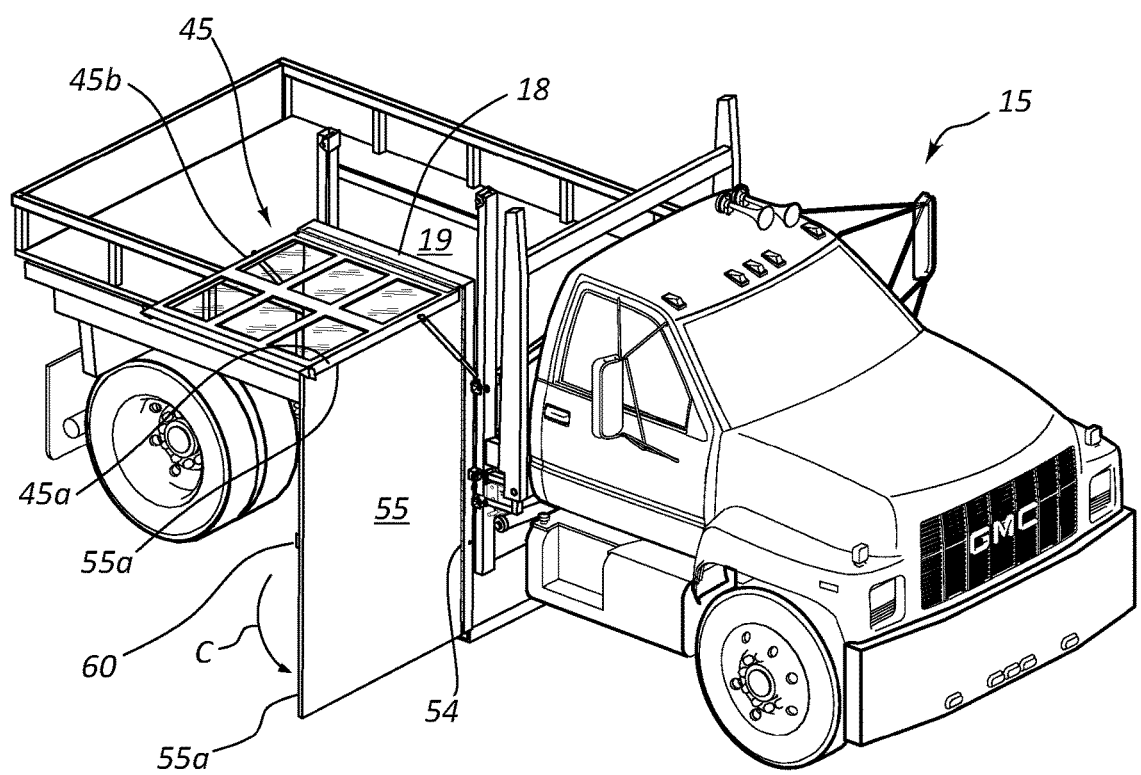
FIG. 4 is a view like that of FIGS. 1 through 3, showing, with arrow C, a right side panel, that is hinged along a right side of a rear or back panel, as taken from the perspective of the looking out from the toilet system front, and is shown as having been rotated outwardly to support a right edge of the skylight roof panel.

FIG. 4 is a figure like that of FIG. 3, except that is shows the left side panel 55 as having been pivoted outwardly, from its stowed attitude against the back or rear wall 18, around hinge 54 that couples the left side of the frame 21 to the left side of the rear or back wall 18. Which left side panel 55 is to be rotated to where panel top edge 55a supports the edge 45a of the skylight roof panel 45. Which panel movement is illustrated by curved arrow C.

Figure 5:
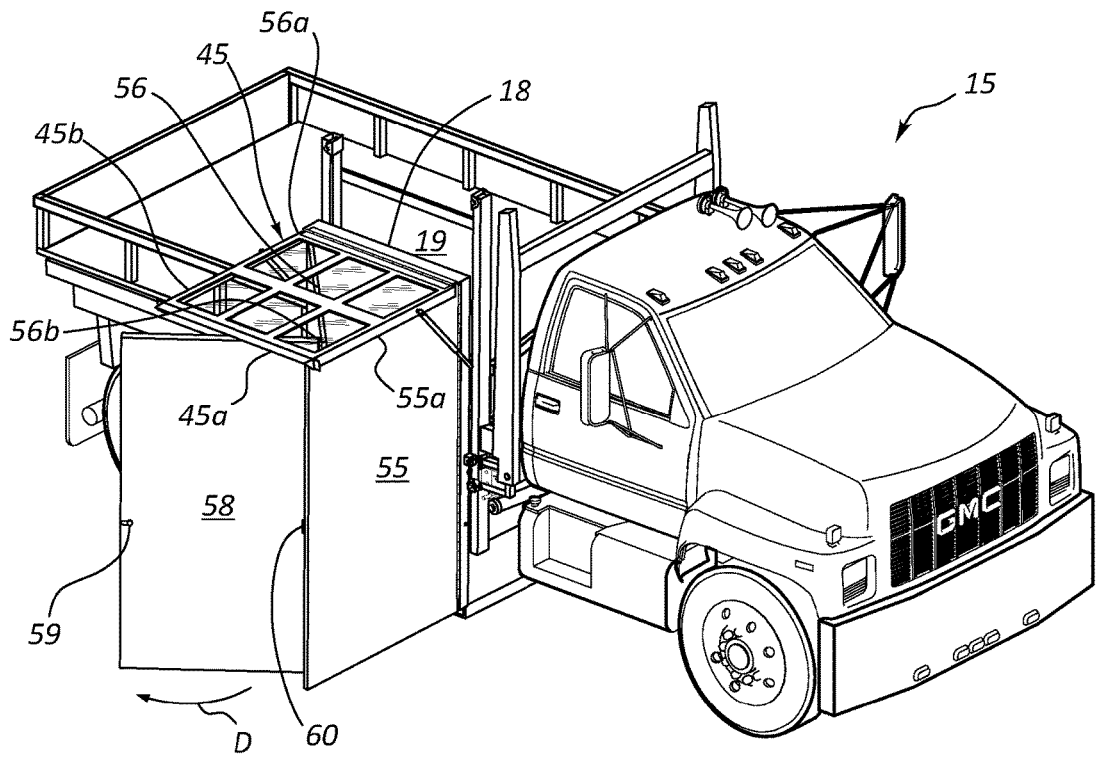
FIG. 5 is a view like that of FIGS. 1 through 4, showing, with arrow D, a left side panel that is hinge connected to a left side of the rear or back panel and includes a hinge connection to a left side of a toilet system access door, which side and toilet system access door are shown as being rotated outward to where the top edge of the left side panel supports a left edge of the skylight roof panel, as shown by arrow D.

FIG. 5 is a view like that of FIGS. 1 through 4, showing, with arrow D, a right side panel 56, as taken from the perspective of a person looking outward from the toilet system 20, that is connected by a hinge 56a to the right side of frame 21 that mounts the rear or back panel 18. Additionally, the forward edge 56b of the right side panel 56 is connected by a hinge 57 to a right side of a toilet system access door 58. Which right side panel 56 and toilet system access door 58 are shown as being rotated outward to where the top edge 56c of the right side panel 56 will support a right edge 45b of the skylight roof panel 45. So arranged, as shown in FIG. 6, the toilet system access door 58 will swing freely around its hinge 57, as illustrated by arrow E, to the forward edge 56b of the right side panel 56, and which toilet system access door 58 includes a latch 59 that is located at a mid point along its right edge for that is for turning to provide a releasable connection of a coupling 60 that is secured to an outer edge 55b of the left side panel 55.

Figure 6:
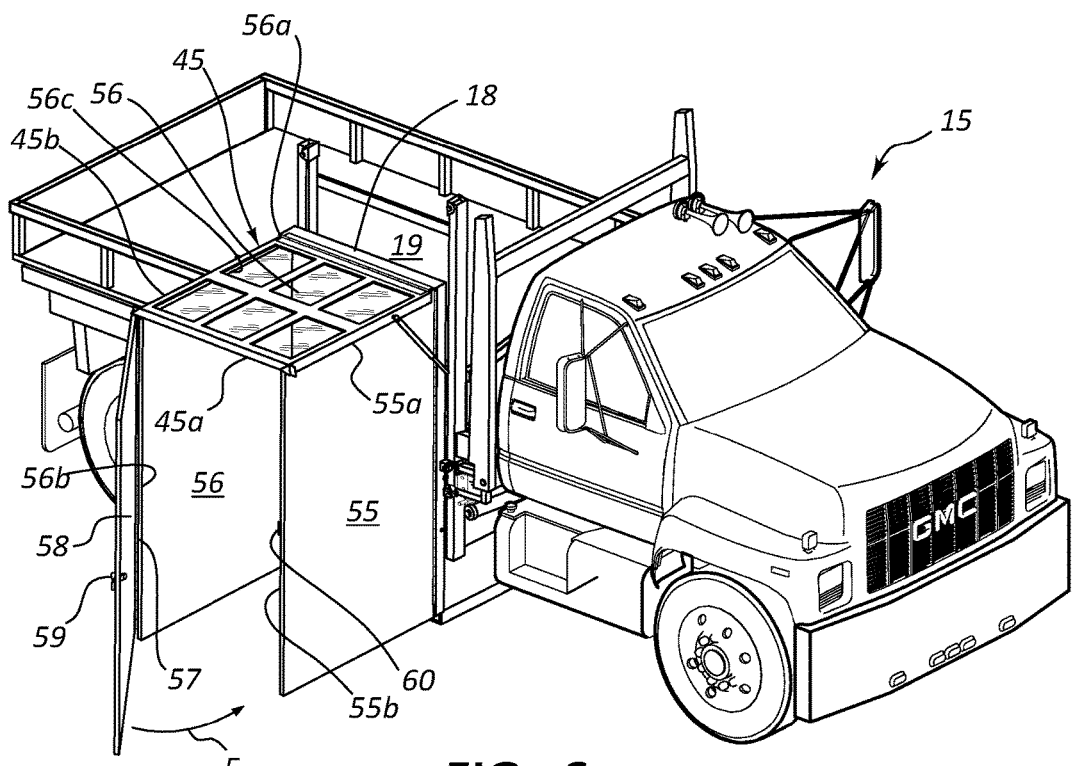
FIG. 6 is a view like that of FIGS. 1 through 5, showing, with arrow E, the access door panel as having been pivoted along a hinge connect to a leading edge of the left side panel, to, when closed, be positioned slightly below a top end of a leading edge of the right side panel, and is spaced a short distance above the ground, to allow for a free rotation of the access door panel around its hinge connection to the left side panel.

FIG. 6 is a view like that of FIGS. 1 through 5, and shows, with arrow E, the toilet system access door 58 as having been pivoted around a hinge 57 that is fixed to a leading edge 56b of the left side panel 56, and, which access door 58, when closed, can be releasably locked by a turning of the latch 59 into a coupling 60, shown in FIGS. 5 and 6, that is secured to the leading edge 55a of the left side panel 55. Preferably, the toilet system access door 58 is formed to be spaced a short distance above the ground and below the leading edge of skylight roof panel forward edge 45a to allow for a free rotation of the access door 58 around its hinge connection at 56b to the right side panel 56.

Figure 7:
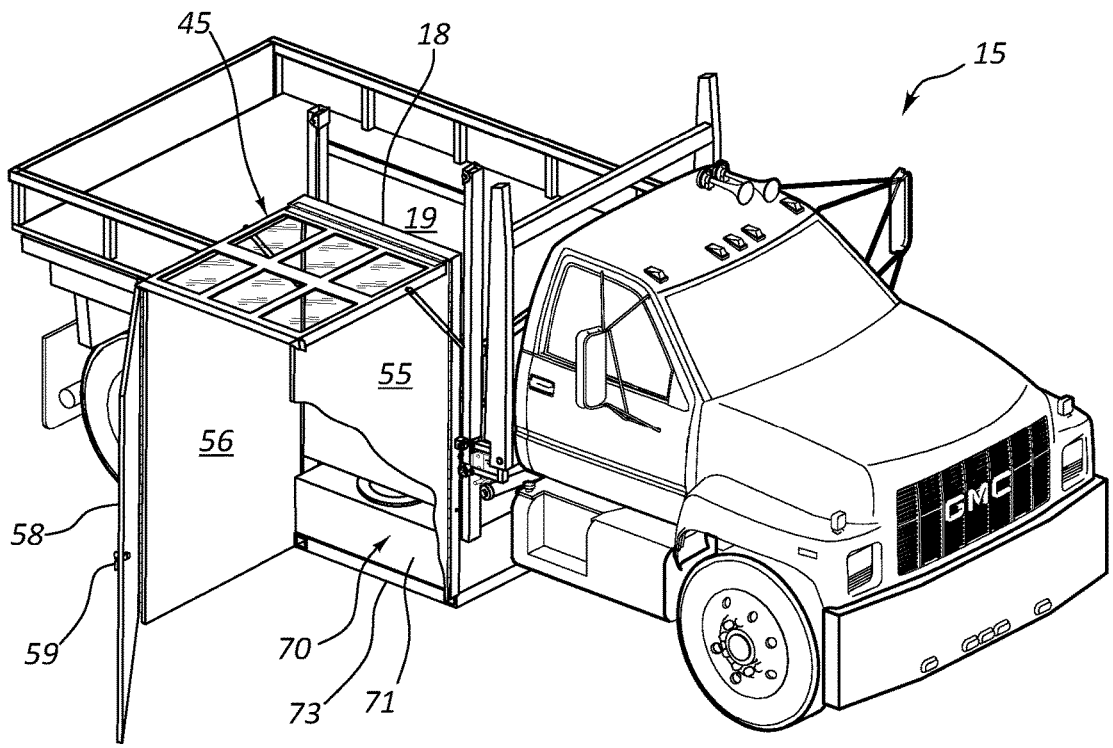
FIG. 7 is a view like that of FIGS. 1 through 6, showing the access door as open with the right side panel as having been cut away, exposing a toilet platform with toilet seat therein, shown in a retracted attitude.

FIG. 7 is a view like that of FIGS. 1 through 6, showing the access door 58 as being open with the left side panel 55 shown as having been partially cut away, exposing a toilet platform 70 mounted on a skid 73 and a front portion of a toilet seat 71 therein, with the toilet platform 70 in its retracted attitude.

Figure 8:
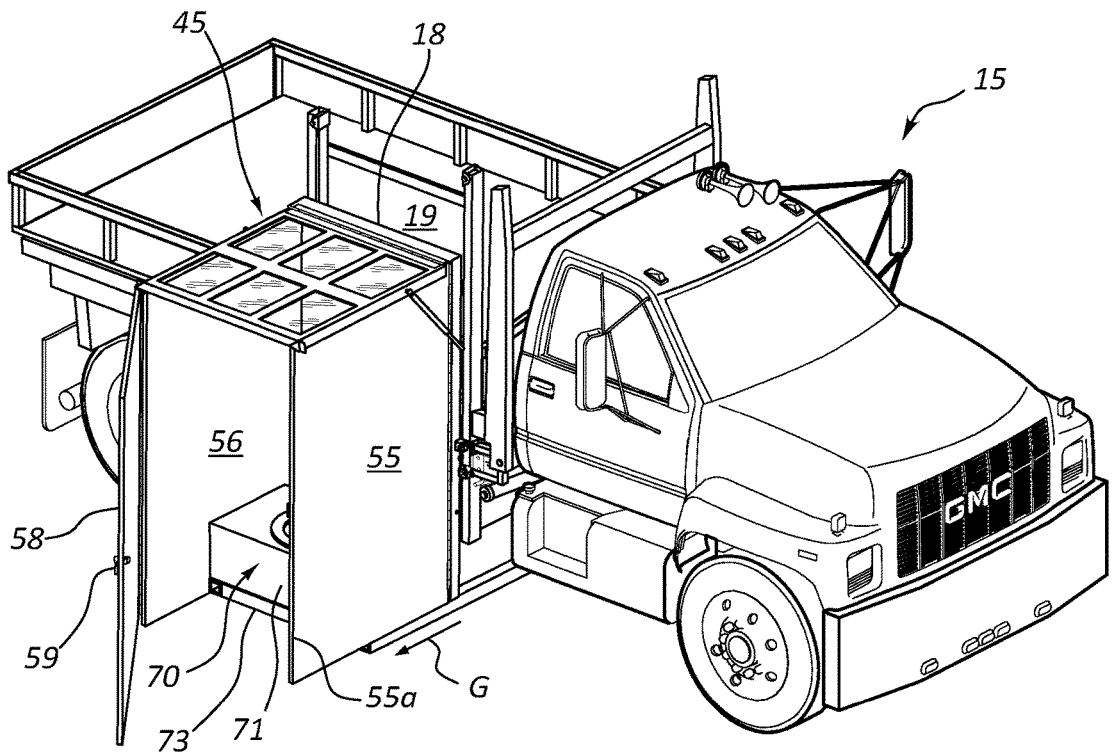
FIG. 8 is a view like that of FIGS. 1 through 7, only showing the toilet platform mounted on a frame and toilet seat as having been moved out along the ground to where it is ready for use.

FIG. 8 is a view like that of FIGS. 1 through 7, only showing the a all of the left side panel 55, with the toilet platform 70 and toilet seat 71 mounted on a skid 73 that is shown, as illustrated by arrow G, as having been moved out from its retracted attitude, along the ground, to position the toilet platform 70 for use.

Figure 9:
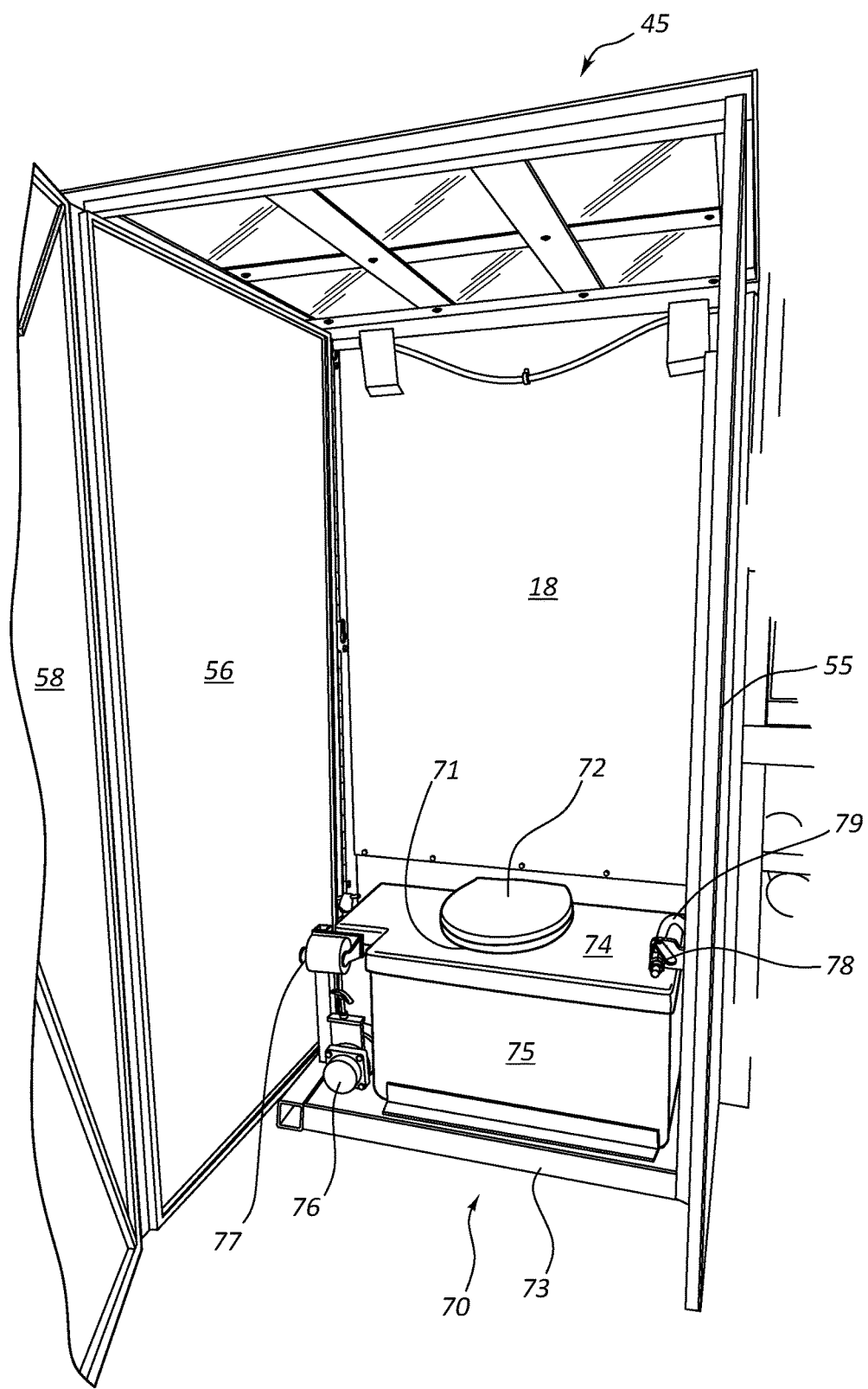
FIG. 9 shows an enlarger front view of the toilet platform and toilet seat within the portable private toilet system cubical, showing a front elevation view of the components thereof, that include a dump valve on the right side of the toilet housing, below a toilet paper dispenser, with the toilet seat lid shown in a lowered to a covering attitude.
Figure 9A:
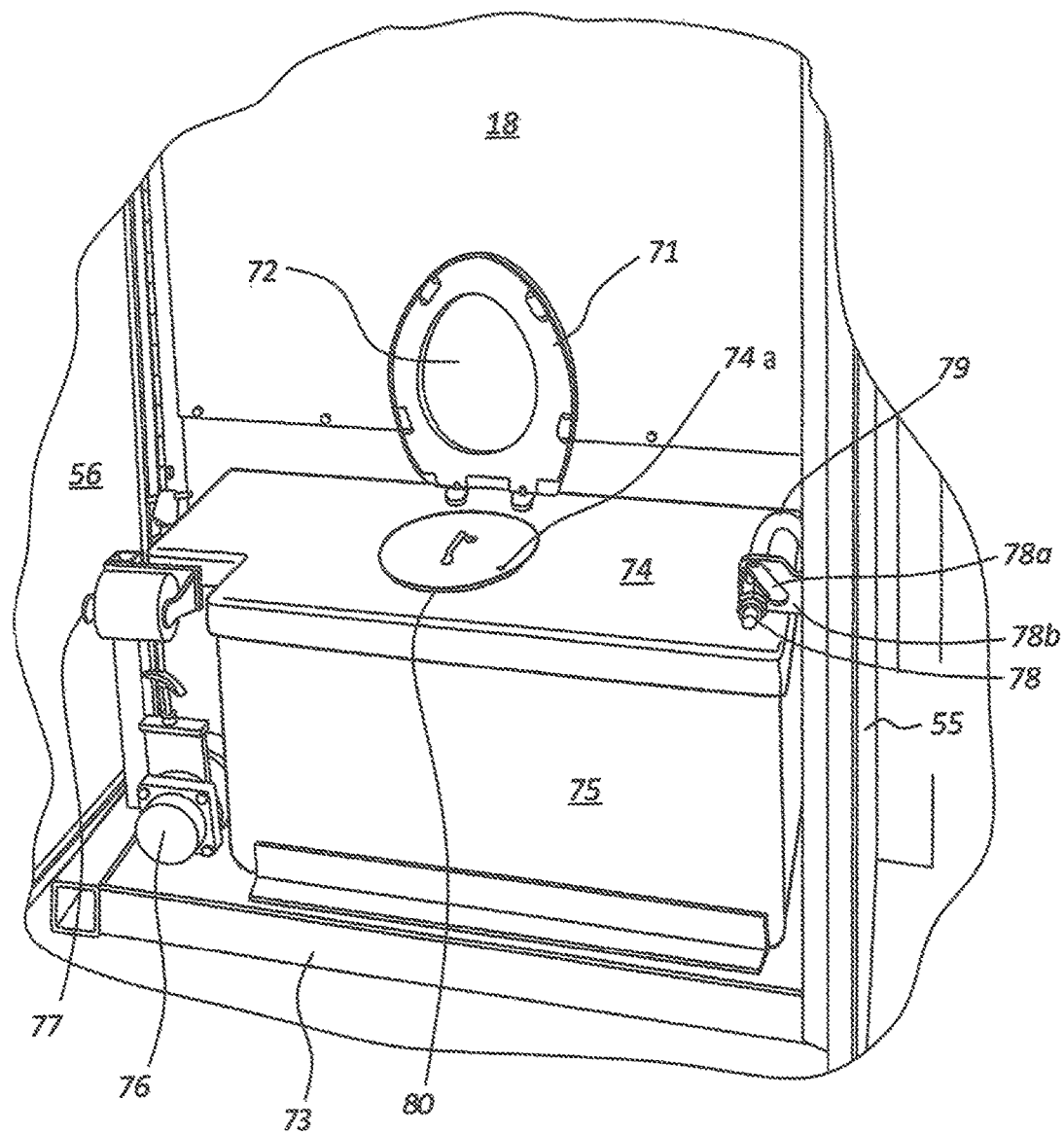
FIG. 9A shows a view like that of FIG. 9 only showing the toilet seat and toilet seat lid as having been lifted to show a splash cover fitted, in a covering attitude, over the toilet opening.

FIG. 9 shows an enlarged frontal perspective view of the toilet platform 70 and toilet seat 71 with a toilet lid 72, arranged within a cubical formed by the out folding of the right and left side panels 55 and 56, rear or back panel 18, and access door 58, and the lowering of the skylight roof panel 45 to rest on the edges of the right and left side panels 55 and 56, forming the cubical of the toilet system 20, and shows a front elevation perspective view of the access door 58 as having been opened to expose the toilet platform 70 that includes a rectangular toilet system housing 75 topped by a toilet seat support plate 74 mounting the toilet seat 71 and a toilet seat cover 72, respectively, that are shown closed in a covering attitude over a toilet opening 80 that is formed through the toilet seat support plate 74, as shown in FIG. 9A, and showing the toilet platform 70 as having been moved to where it is ready for use. Which FIG. 9 also shows components of the toilet system 20 that include a dump valve 76, located below a toilet paper dispenser 77, on a right side of the toilet seat support plate 74, and shows a toilet flush valve 78 with handle 78a connecting through a line 79 to provide water to a toilet bowl within the rectangular toilet system housing 75. FIG. 9A also shows the toilet seat 71 and lid 72 as having been lifted to show a splash cover 74a fitted in a covering attitude over a toilet opening 80.

Figure 10:
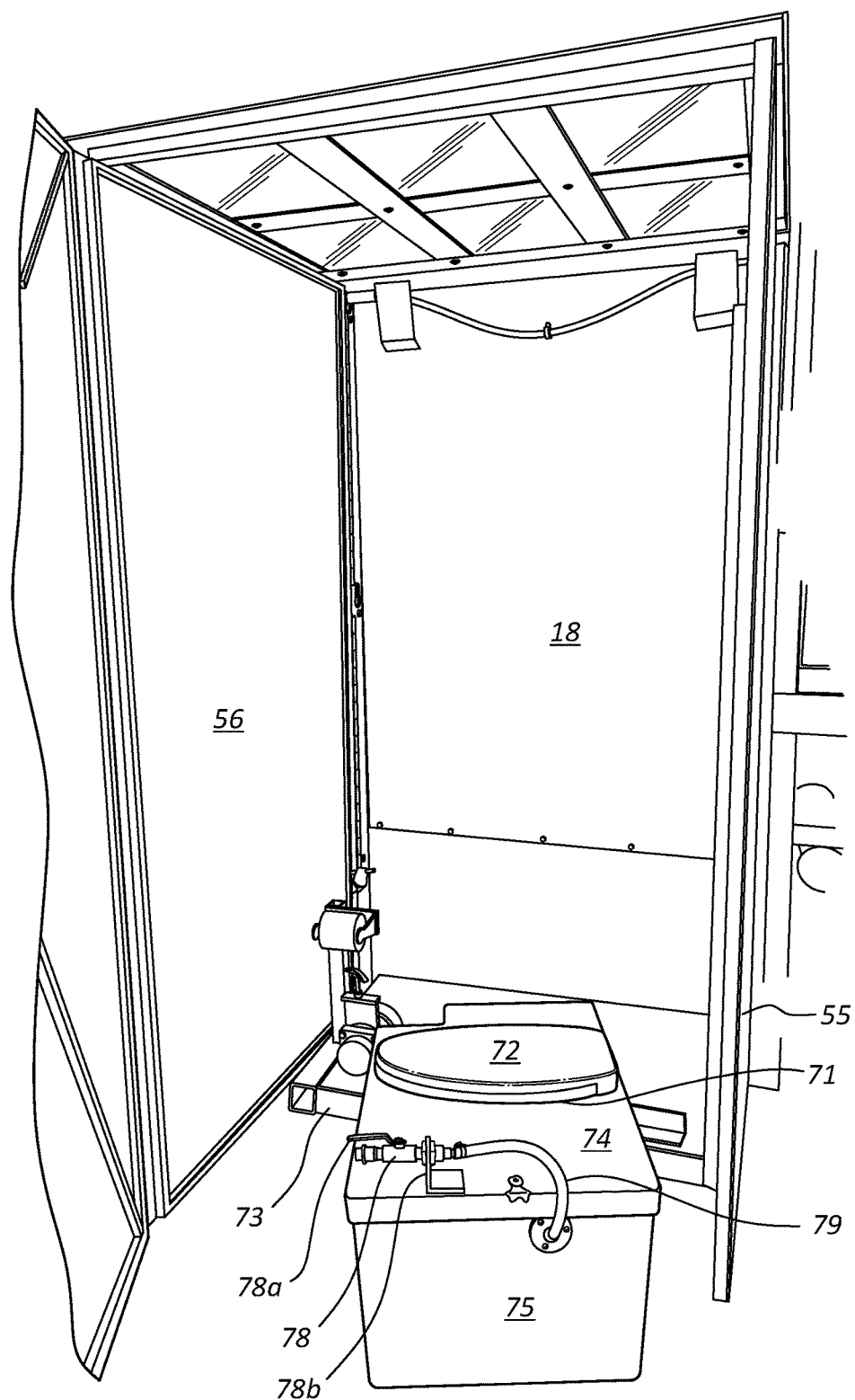
FIG. 10 shows the toilet system as having been removed and rotated 90 degrees clockwise to show the left side of the toilet system, and showing the toilet system flush valve.

FIG. 10 shows the toilet system 20 rectangular toilet system housing 75 as having been moved off of its skid 73 and rotated ninety degrees clockwise to show the left side of the toilet system housing 75 as including the toilet flush valve 78 and movable handle 78a that are fitted through a mounting 78b to the top of the toilet platform 70 and shows the line 79 fitted through the side of the toilet housing 75 and to provide fresh water to a toilet bowl within the toilet system housing 75, not shown, with such fresh water from a water to be supplied from holding tank, not shown, or from other water source carried on the transport vehicle 15. Which toilet system housing 75 is also arranged to hold the toilet waste water as flows from a flushing of the toilet bowl within the toilet housing 75, by operation of the toilet flush valve 78. The functioning of which toilet system 20, it should be understood, is like that of a conventional toilet with the toilet wastewater produced by each flushing remaining in the toilet housing 75 until it can be drained therefrom by operation of the dump valve 76 that, in practice is connected to a toilet water drain valve 84, as shown in FIG. 11, that feeds the toilet waste water into a dump, such as an RV dump. as is commonly found in a motor home park.

Figure 11:
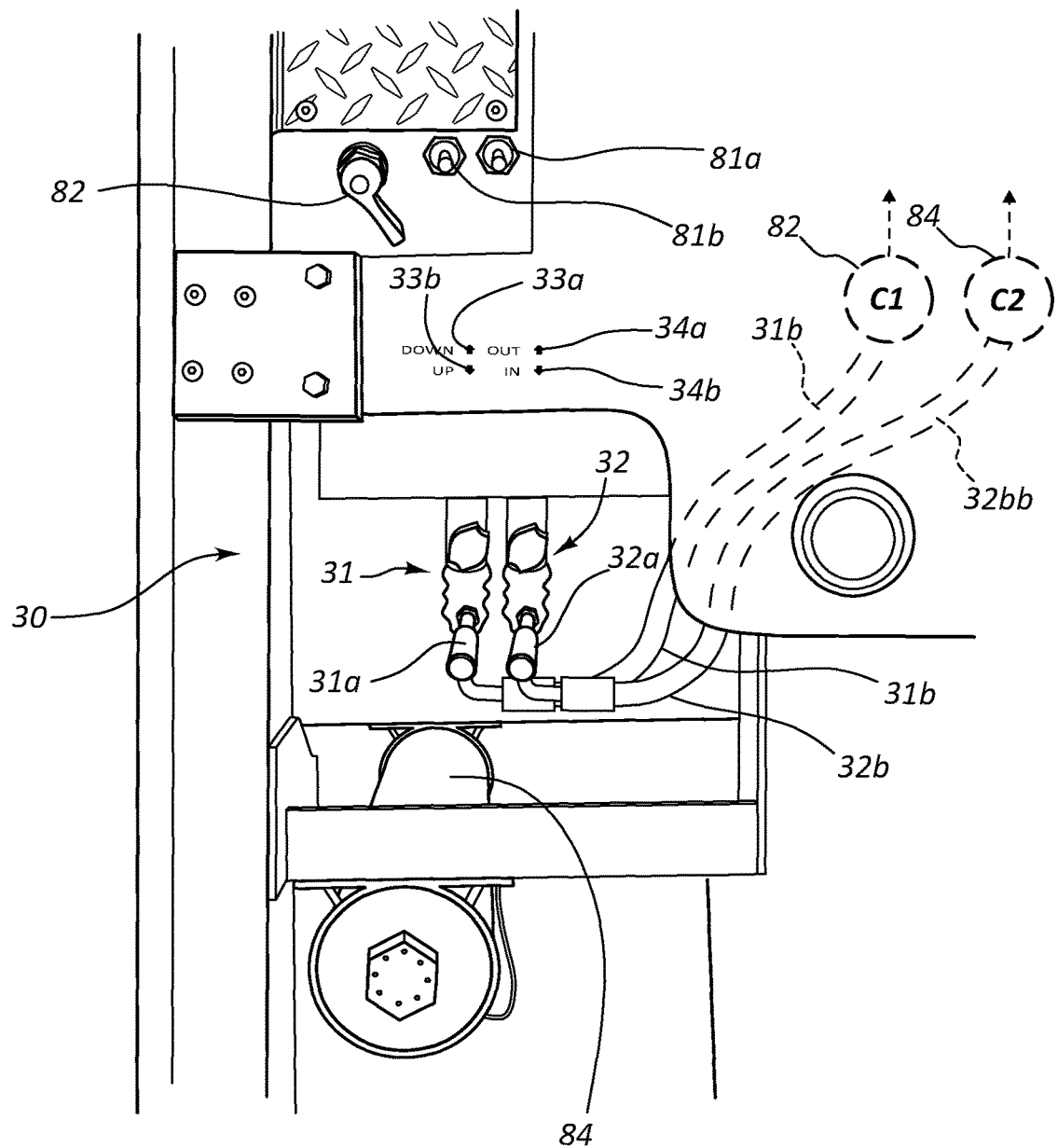

FIG. 11 shows a front elevation view of the panel 30 of FIG. 2A, that utilizes lever arm activated valves 31 and 32 and electrical controls switches 81a, 81b and 82 for switching the system electrical controls on and off and operating the hydraulic system connected to the valves 31 and 32 through lines 31b and 31bb from vessels C1 and C2, herein 82 and 84, from the vehicle hydraulic system or from a hydraulic system of the toilet system 20, not shown. The operation of which lever arm activated valves 31 and 32 by vertical movement of arms 31a and 32a, respectively, between indicators 33a and 3b and 34a and 34b, as shown and described with reference to FIG. 2A, provides a flow of fluid under pressure to operate the system hydraulic components to lift and lower and move the toilet system 20, as described, from its stored attitude for use and for moving it back to its stored attitude by operation of the hydraulic valve 31 and for moving the toilet platform 70 from its stowed attitude beneath the vehicle into the toilet system 20 cubical and back to its stowed attitude by movement of the arm 32a, as described in FIG. 2A. It should be understood that the electrical controls, shown in FIG. 11 as button switches 81a and 81b and master switch 82, provide for energizing the toilet system 20 electrical system.

Figure 12:
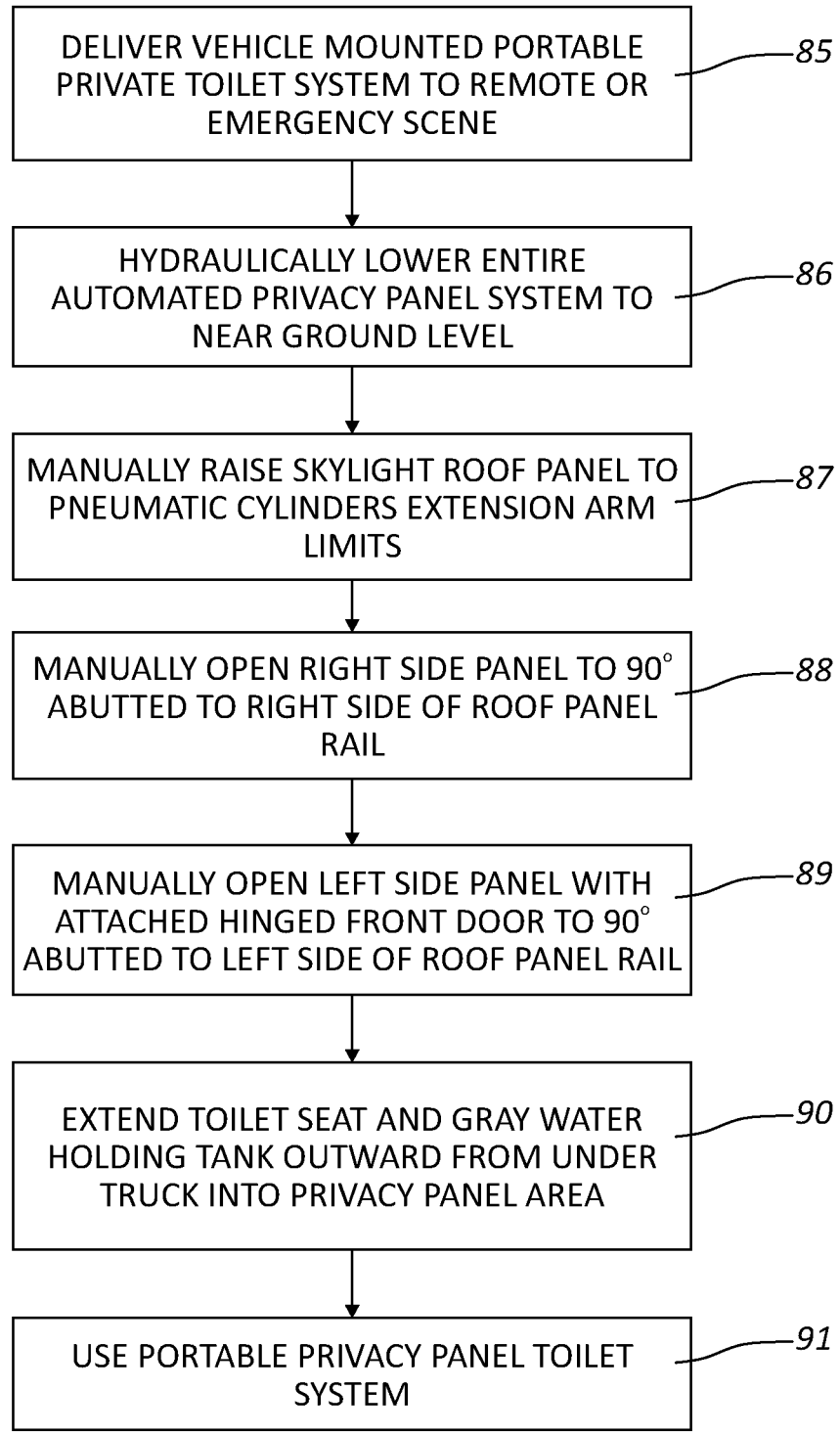
FIGS. 12 and 13 show block flow schematic drawings of the steps practiced for out folding the panels into the toilet system cubical, operating the toilet system and for infolding to collapse the toilet system for transport.
Figure 13:
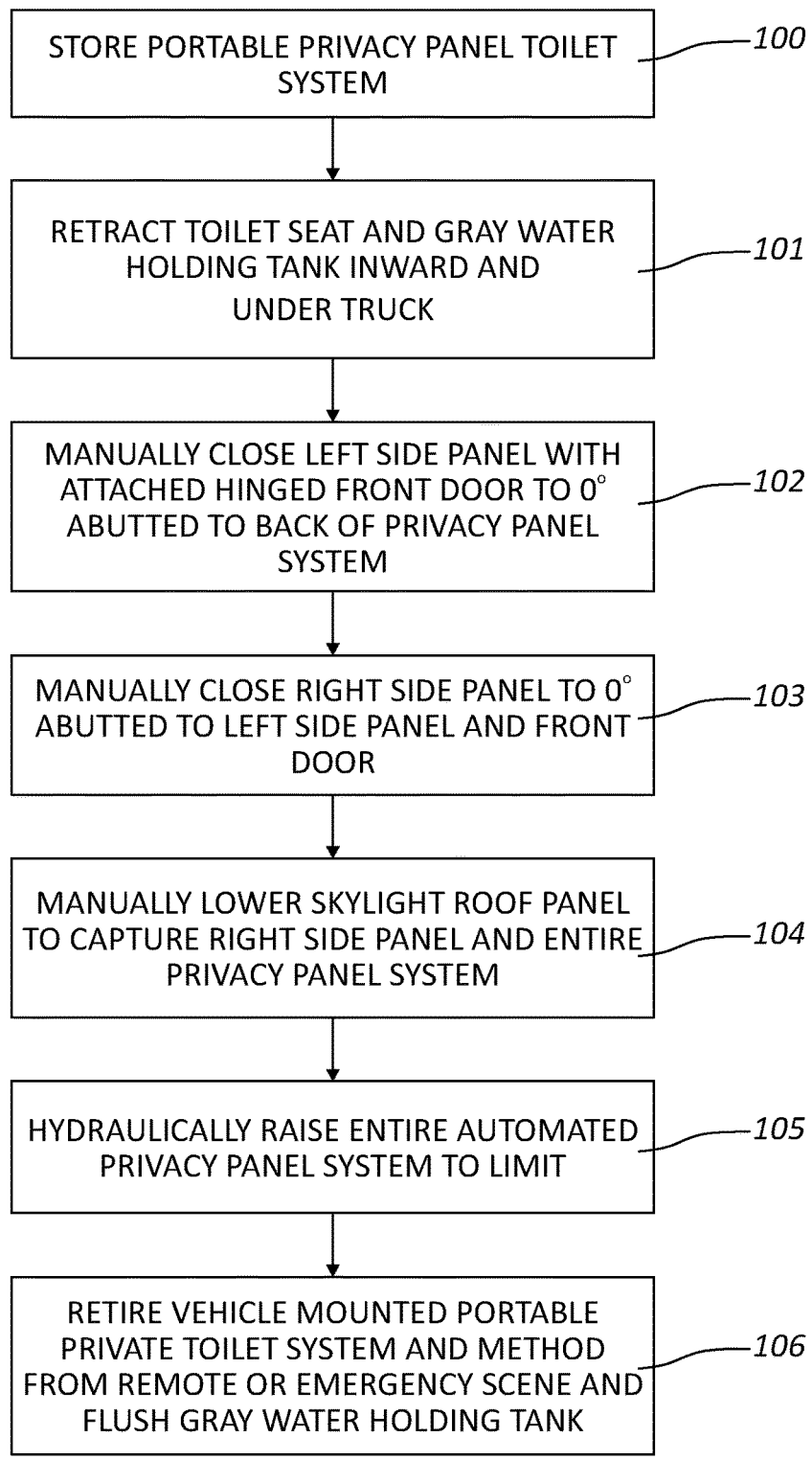

FIGS. 12 and 13 show block flow schematic drawings of the steps practiced for assembling the toilet system 20 by lowering the component panels and frame 21, maintained to move vertically along side rails 22 that are secured in spaced parallel relationship to opposite vertical sides of wall 19 that is fixed to the side of the vehicle 15. Whereafter, the component rear or back wall panel 18, side panels 55 and 56 that hinge connected to the rear or back wall panel 18 and the left side panel 56 that is hinge connected to access door 58, and skylight roof panel 45 that is hinge connected to a top edge of the rear or back panel 18 are pivoted appropriate around their hinge couplings to one another, forming a cubical that contains a toilet platform 70 that is slid into which cubical, readying the toilet system 20 for use. After use, the toilet system platform 70 is moved back to its stowed attitude to the vehicle 15 and the steps in erecting toilet system are reversed, infolding the side and access door panel and a lowering of the skylight roof panel, collapsing the panels and skylight roof panel upon themselves into an upstanding stack, that is then lifted back to its stowed attitude to the vehicle, and the skylight roof panel and panel stack are locked to the rails for travel.

FIG. 12 illustrates the steps practiced in transporting the toilet system on an emergency vehicle to a remote or an emergency scene, and setting up the toilet system for use. In FIG. 12, a block 85 sets out movement of the emergency vehicle that mounts the toilet system to a fire, remote or an accident scene. Block 86 covers a hydraulically lowering of the panel system after the toilet system and skylight roof panel have been unlocked from their transport attitude. Block 87 calls for manually raising the skylight roof panel to the limit of travel of a pair of pneumatic arms after that skylight roof panel has been released. Block 88 sets out a manual opening of the right side panel that travels under the skylight roof panel edge to where the right side panel top edge supports the skylight roof panel right edge. Block 89 calls for manually opening the left side panel, whereto the access door is hinge connected to the forward edge of which left side panel, to where the top edge of the left side panel is positioned under, to support, the left edge of the skylight roof panel, with the access door to swing freely around its hinge coupling to allow entry into and egress out from the cubical that is formed by which side and skylight roof panels. Block 90 sets out moving the toilet platform horizontally along the ground from its stored attitude under the transport vehicle to its position in the cubical. Block 91 indicates that the toilet system is ready for use.

FIG. 13 sets out the steps involved in closing the toilet system in preparation for vehicle travel to another fire, remote or emergency scene, and flushing the collected toilet wast water from the system.

Block 100 identifies a storing of the toilet system, after use, in anticipation of moving the toilet system to another location, and block 101 calls for retraction of the toilet system housing after fitting the toilet cover into the toilet opening, rotating the toilet seat and cover over the toilet opening, and retraction of the toilet system by operation of the hydraulic mechanism. Block 102 sets out the manual infolding of the side panels and access door starting with the left side panel whereto the access door is hinge connected, to where the access door is in contact with the left panel that is in contact with the back or rear panel. Block 103 calls for the manual infolding of the right panel to where it is in contact with the access door. Block 104 sets out a lowering of the skylight roof panel around its hinge connection to the back or rear panel. Block 105 calls for hydraulically lifting the frame that mounts the toilet system back to its stowed attitude to the emergency vehicle to include mechanically locking the frame to at least one of the side rails that are fixed to the side of the emergency vehicle, and calls for locking the skylight roof panel to the frame to prohibit its movement away from the right panel during transport. Block 106 calls for the emergency vehicle to leave the emergency scene and travel to where the toilet waste water contented in the toilet system housing can be dumped.

Hereinabove has been set out a description of a preferred embodiment of the portable private panel toilet system of the invention and the steps for folding out the panels of the toilet system for use mounted from an emergency vehicle at a scene of an emergency and for infolding which panels back to their stowed attitude after use, and for cleaning the toilet system in anticipation of transporting the toilet system to another emergency scene, of the invention. It should however, be understood that the present invention can be varied within the scope of this disclosure without departing from the subject matter coming within the scope the following claims, and a reasonable equivalency thereof, which claims I regard as my invention.

I claim:

1. A portable private toilet system comprising, a rectangular toilet system frame that mounts a flat rear panel; a pair of parallel side rails that are fixed to a transport vehicle and are spaced apart to receive vertical sides of said toilet system frame; a first mechanical locking means for maintaining said frame to at least one of said parallel side rails; a flat skylight roof panel having parallel forward and rear ends and parallel sides where said skylight roof panel rear end is connected to a top end of said toilet system frame by a top hinge means to move between a vertical attitude and outwardly extended attitude to a front surface of said rear panel to where said skylight roof panel is at approximately a right angle attitude to said rear panel top end, and includes a second mechanical locking means for holding said skylight roof panel in its vertical attitude to said a rear panel; hydraulic means for lowering said rectangular toilet system frame to ground after release of said first and second mechanical locking means; a left rectangular side panel, as taken from the perspective of a person looking outwardly from a front of the toilet system, that includes a first hinge means that pivotally connects a left edge of said left rectangular side to a left edge of said rear panel; a right rectangular side panel that is connected by a second hinge means to a right edge of said rear panel, and a left edge of said right rectangular side panel is connected by a third hinge means to a right edge of a rectangular access door panel; which said left and right rectangular panels, when pivoted around their said first and second hinge means, that connect to said opposite vertical edges of said rear panel, will extend at a right angle from said rear panel vertical edges such that the top edge of said left panel will support a left side of said skylight roof panel and the top edge of said right panel will support a right side of said skylight roof panel, and said rectangular access door will swing freely around said third hinge means and extend across an opening between front edges of said left and right rectangular panels, forming a toilet system cubical; a rectangular toilet platform that, in its retracted attitude, is maintained in a stowed position to the vehicle, and is connected to a hydraulic system means for moving said rectangular toilet housing out from its retracted attitude out to within said toilet system cubical, and which said rectangular toilet platform contains a toilet bowl that is to contain a level of fresh water that is fed through a water line from a fresh water source and includes a toilet flush valve arranged on a side of said rectangular toilet platform that is manually operated to open said fresh water source to flush said toilet bowl and refill said toilet bowel for a next use, and is open through a toilet opening through a top surface of said rectangular toilet platform, and includes a toilet seat and toilet cover, and said toilet bowl connects to a dump valve of said toilet system that provides for draining the flushed toilet waste water from said rectangular toilet platform toilet waste water container.

2. A portable private toilet system as recited in claim 1, further including, a control panel fixed to a side rail to be proximate to the passenger side of the vehicle and be accessible to a person, that is for operating the hydraulic systems of the toilet system and includes a pair first and second valve means that each include a lever arm arranged to be moved up and down to operate each said first and second valve means, and each said first and second valve means includes a pair of first and second fluid lines, and each said first and second fluid lines connects on one end to a source of hydraulic fluid under pressure and each said first and second line connects, on its opposite end, to each said first and second valve means, with said first valve means to provide a flow of hydraulic fluid to raise or lower the toilet system and said second valve means to provide a flow of hydraulic fluid to move the rectangular toilet platform horizontally in or out; and said control panel also includes one or more electrical switches for electrically powering the electrical components of the toilet system.

3. A portable private toilet system as recited in claim 2, wherein the said first and second valve means and said pair of first and second fluid lines each connect on one end to the vehicle hydraulic system to receive hydraulic fluid under pressure.

4. A portable private toilet system as recited in claim 1, wherein the first mechanical locking means is a spring biased lock that includes a body that is mounted onto one of the vehicle side rails such that an end thereof is proximate to the adjacent surface of the toilet system frame, and which body contains a coil spring fitted around a pin that urges said pin end towards an adjacent surface of said toilet system frame, which said coil spring urges said pin end to extend outwardly to fit within a hole formed in said toilet system frame, whereby, with a retraction of said pin end out of said rectangular toilet system hole, said toilet system can to be lowered to the ground, and which said pin retraction is provided by manually pulling a handle that is secured across said pin base end, and which said pin retracted attitude can be maintained by a turning of the handle whereby a peg of said handle, that is formed to extend outward from said pin, and align with a horizontal notch that is formed in said the body.

5. A portable private toilet system as recited in claim 1, wherein the second mechanical locking means is a spring biased lock that includes a body that is mounted onto one of the vehicle side rails and includes pin that slides within said body, which said pin is biased by a coil spring to extend out from a top end thereof out of an opening in said body top end to fit into a hole formed through a flat side of a bracket that extends at a right angle outwardly from a bracket flat base that is mounted onto a lower end of the right side of the skylight roof panel, and includes a ring that is fitted through a bottom end of said pin against the biasing of said coil spring to retract said pin top end out of said bracket hole such that, when said pin end is pulled out of said bracket hole, said skylight roof panel can be pivoted to extend outwardly from the rear panel.

* * * * *